FIG_1

FIG_2

Inventors
MERRIL L. BOX
ROBERT W. CASON

United States Patent Office 2,741,365
Patented Apr. 10, 1956

2,741,365

MACHINE FOR DETECTING AND EJECTING IMPROPERLY LABELED CANS

Merrel L. Box, Buena Park, and Robert W. Cason, Fullerton, Calif., assignors to Merrel Manufacturing, Fullerton, Calif.

Original application November 28, 1949, Serial No. 129,706, now Patent No. 2,660,304, dated November 24, 1953. Divided and this application December 31, 1952, Serial No. 329,002

12 Claims. (Cl. 209—81)

This invention relates to apparatus for inspecting and sorting articles and particularly to an apparatus adapted for use in inspecting the labels of cans and capable of separating defectively labeled cans from those to which perfect labels have been properly applied, the apparatus having particular utility when used for inspecting cans delivered from a can-labeling machine.

The present application is a division of application Serial No. 129,706, now Patent 2,660,304, filed by us November 28, 1949.

Various machines have been proposed for inspecting and sorting cans passing from can-labeling machines, the purpose of such can-sorting machines being to detect cans which have improperly applied and damaged labels and to separate such defectively labeled cans from the line of cans being conveyed from the labeling machines to packaging apparatus. While such sorting machines are employed quite extensively in canneries and other processing establishments, it is common knowledge that they are quite inefficient in performing their intended function. Such inspection machines operate on the principle of electrical detection, that is, they employ one or more detector or contact elements disposed in the path of movement of the cans rolling from the labeling machine and across which the cans pass. The detector elements are connected in an electrical circuit which includes one or more solenoids capable, when energized, of operating a dual gate disposed in the path of movement of the cans so as to eject improperly labeled cans from the line of cans passing normally through the machine.

The detector elements are adapted to engage the periphery of each labeled can and are intended to close the electrical circuit through the metal of the can when they encounter exposed surfaces of the can, that is, areas of the cylindrical surface of a can which have not been covered by the label, as may occur when no label has been applied, when the label is improperly applied, or when the label is torn. However, it has been determined that previous can-sorting machines are subject to several deficiencies. For example, in such machines a pair of laterally spaced electrical detector elements are employed and function to close the gate solenoid when an exposed portion of a can bridges the entire gap between the two elements. It is apparent, therefore, that unless the tear in the label is at least as long as the gap, the electrical circuit will remain open, and the defective can will not be ejected by the gate. Moreover, the detector or contact elements are usually located adjacent the center of the line of travel of the cans so that they detect only those exposed portions of a can which appear in the central portion thereof. This is a disadvantage since, as is well known to cannery operators, almost all tears occur adjacent the edges of the labels due to the fact that these edges sometimes catch on various parts during the label applying operation, and, due to improper feeding and uneven tensioning of the paper, the detector elements do not always contact the edges of the can. As a result, cans having damaged labels are delivered to the packaging machine, unless the cans are subsequently inspected by cannery workers.

It often occurs that the paper labels become torn at the overlapping seam, and it is thus imperative that the detector means engage this portion of the periphery of a can rolling through the machine. When cans of predetermined diameter are to be sorted, the detector elements are so disposed that they engage the seam of the label. However, it is highly desirable that the machine be capable of inspecting cans of various diameters. Consequently, it is necessary that the detector elements be either adjustable lengthwise of the track or be of sufficient length to insure that they will positively engage the seam portions of labels on cans of different diameters as the cans roll along the track. In one form of conventional apparatus, the detector means consists of a pair of laterally spaced, longitudinally extending detector bars upon which the cans roll during their travel along the track, these bars being intended to contact bare portions of cans to which the labels have been improperly applied at the seam. Such detector bars are inefficient in performing such function and have the disadvantage of creating frictional drag on the cans to impair their free rolling movement through the apparatus in which they are incorporated.

Another disadvantage of prior detector means of conventional can-sorting machines is that they are unable to detect loose flaps of the can labels. That is to say, it sometimes occurs that during the applying of a label, the overlapping end of the label is inadequately glued to the underlying end of the label with the result that the overlapping end projects from the can in a loose flap and is quite apt to be torn off during subsequent handling to mar the appearance of the can or to cause displacement of the entire label from the can. Prior can-sorting apparatus embody no means for detecting such loose flaps, and as a result defectively labeled cans are often packaged and shipped from the canneries.

It is an important object of this invention to obviate the difficulties experienced through the use of prior can-sorting machines by providing an apparatus which embodies a novel and highly efficient means for detecting improperly labeled cans and for separating such cans from a line of the cans passing through the apparatus.

Another important object is to provide a detector means which comprises a pair of detector elements along which the cans travel, said elements being in the form of relatively long coil springs extending in the direction of travel of the cans. Due to their resilient nature, the detector springs yieldingly engage the peripheries of the cans and thus positively contact the same.

Another object is to provide a detector means, of the character referred to above, in which the detector springs are made in the form of endless elements carried by longitudinally spaced pulleys, said springs being rotated in the direction of travel of the cans through the machine so that the springs offer little or no resistance to the movement of the cans.

Another object is to provide a detector means of the type indicated in which the individual spring elements are adapted to be so disposed that they engage the end portions of the cans, where the major part of the defects occur in the labels. A related object is to so connect the detector elements in the electrical circuit for the gate-operating means that closing of the electrical circuit is established through either element, the metal of the can and the track along which the can rolls so that it is possible to detect small tears or other imperfections occurring adjacent the edges of the label. Since the elements are elongated and their effective length is at least equal to the circumference of a can, they positively inspect the entire label for imperfections.

Another object is to provide detector means of the type specified in which endless detector elements are adjustably mounted so that they can be inclined with respect to the track along which the cans roll. By this construction, the leading ends of the detector elements, that is, the ends nearest the end of the track upon which the cans enter the apparatus, can be adjusted vertically so as to cause a predetermined length of the elements to be disposed in the path of movement of the cans, the effective length of the elements being adjusted so that it is at least equal to the circumference of the cans being inspected, the adjustment thus adapting the elements to act upon cans of different diameters.

It is another object of this invention to provide a can-sorting machine which includes a second detector means for detecting the presence of loose flaps on the can labels, this means consisting of a crystal detector having a sensitive finger disposed in the path of movement of the cans and adjustable longitudinally of the track to adapt it to be positioned at a location wherein it can be engaged by the loose flap of a label.

Another object is to provide in a machine of the class referred to an electronic circuit in which the spring-type detectors and the crystal detector are connected, the circuit also including an electronic control tube which, when activated, functions to actuate a relay, the latter serving to close an electrical circuit which energizes gate-operating solenoids, a switch disposed in the path of movement of the cans and adjacent the gates being connected in series in the electrical circuit and operated by the defectively labeled can to cause the gates to open as the can approaches a gap in the track so as to eject the can from the line of cans passing through the machine.

Another object is to provide an apparatus of the character discussed above, which includes means for advancing the cans in predetermined spaced relationship along the track.

A further object is to provide an apparatus which is wholly adjustable so that cans of various diameters and lengths can be sorted, the adjusting means being relatively simple and readily operated.

A still further object of the invention is to provide a can-sorting machine which is especially simple in construction and one which functions in a more positive manner than other machines heretofore employed for the same purpose.

Further objects will appear from the following specification and from the drawings, which are intended for the purpose of illustration only, and in which.

Referring to the drawings in detail, the improved can-sorting machine comprises a pair of longitudinal side frames 10 and 11 which are provided on their inner faces with longitudinal ledges 12 and 13 which together provide a track 14 along which cans C can roll through the machine. The track 14 may be aligned with a pair of conveyors 15 and 16, the conveyor 15 being adapted to convey labeled cans from a labeling machine (not shown) while the conveyor 16 transports the cans from the sorting machine to any suitable equipment, such as a packaging unit (not shown). The cans, upon being delivered onto the track 14, are fed therealong in spaced relationship by means to be later described. At a point substantially midway of its length, the track 14 is interrupted to provide a discharge opening or gap 17 through which defectively labeled cans or cans having no labels are ejected from the line of cans passing through the machine.

Figure 6:
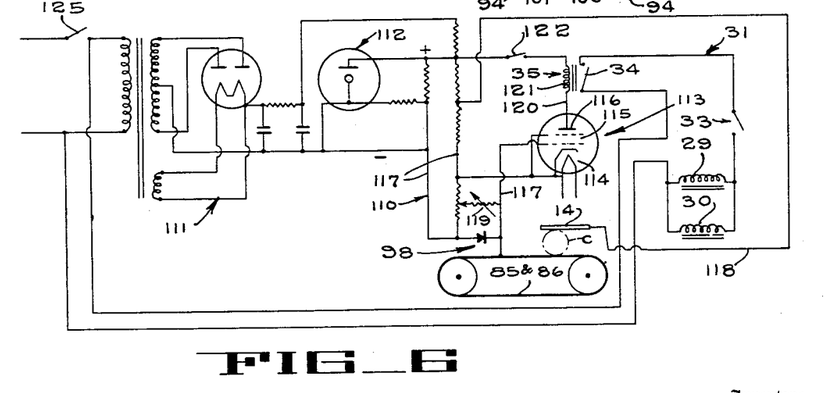
Fig. 6 is a diagram of the electrical circuit of the machine and the electronic circuit for controlling the opening and closing of the electrical circuit.
Figure 7:
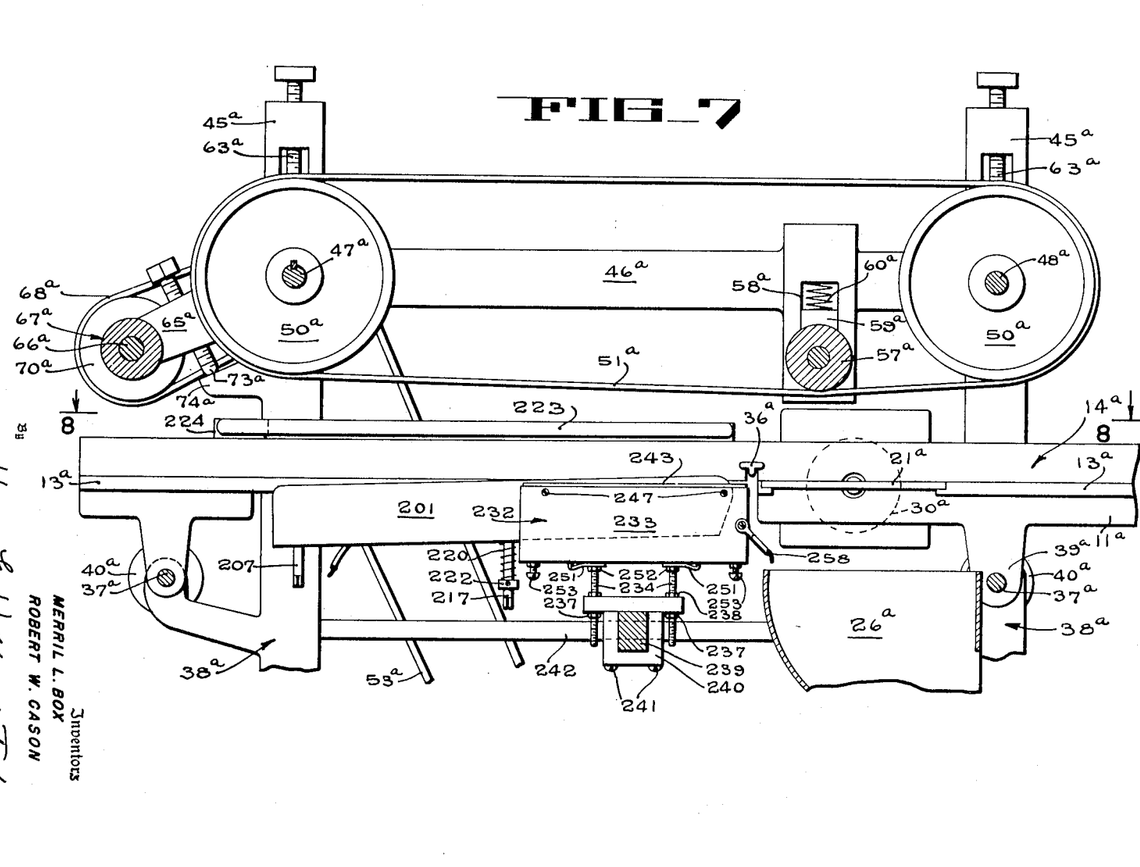
Fig. 7 is a somewhat enlarged longitudinal section similar to Fig. 1 but showing modified forms of defective label and loose end flap detector devices.

Gate members 20 and 21 are slidable in guideways 22 and 23 of the side frames 10 and 11 and are normally projected inwardly by springs 24 and 25 to cause their inner ends to align with and form continuations of the track, the gates thus normally bridging the gap 17 to prevent cans from falling therethrough during their travel through the machine. When the gate members 20 and 21 are drawn laterally outward, however, a can C is caused to fall through the discharge opening 17 into a chute 26 which conveys it to any suitable location. The gate members 20 and 21 are adapted to be withdrawn by means of respective solenoids 29 and 30 which, as shown in Fig. 6, are connected in an electrical circuit indicated generally by the reference character 31. A normally open microactuated switch 33 is connected in series in the circuit 31 and is disposed adjacent the leading edge of the gate members 20 and 21 with its actuating button 36 located in the path of movement of the cans through the machine so as to be depressed by a defectively labeled can in the manner to be hereinafter more fully explained. Also connected in series in the electrical circuit 31 (Fig. 6) is the switch arm 34 of a relay 35, the switch arm 34 being normally open.

Figure 2:
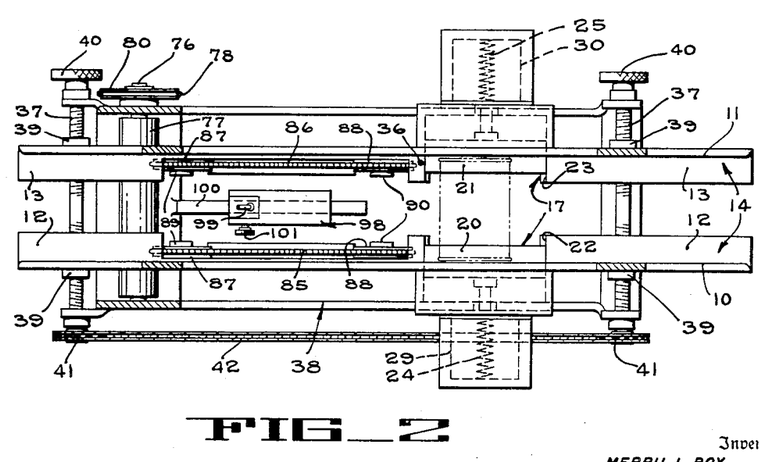
Fig. 2 is a sectional plan view, taken on line 2—2 of Fig. 1.

The side frames 10 and 11 are adapted to be adjusted toward and away from each other so as to vary the width of the track 14 and thus adapt the machine to operate on cans of different lengths. The adjustment means consists of a pair of adjusting spindles 37 which are rotatable at the ends of a bed plate 38. The end portions of each spindle 37 have screw threads of opposite hand, the threads turning in the screw-threaded bores of bosses 39 at the end portions of the side frames 10 and 11 (Fig. 2). The spindles carry knobs 40 at one end and have sprockets 41 at their other end which are connected by a chain 42. Thus, when either knob 40 and the corresponding spindle 37 are rotated, the other spindle is likewise rotated to adjust the side frames 10 and 11 toward or away from each other, depending upon the direction of rotation of the spindles.

Figure 1:
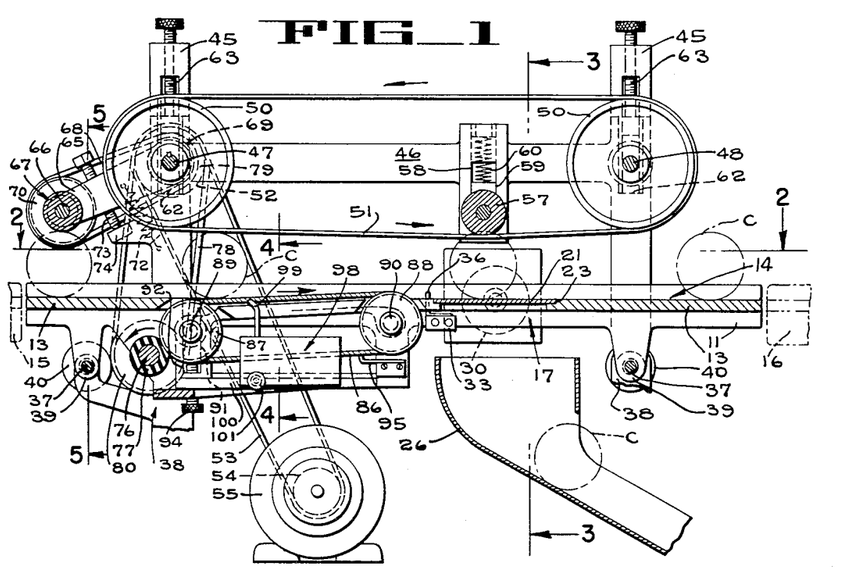
Fig. 1 is a longitudinal sectional view through the improved can-sorting machine.

The side frames 10 and 11 are provided with vertical extensions 45 which are connected by longitudinal struts 46. Rotatable in bearings on the extensions 45 are shafts 47 and 48, each shaft carrying a pair of pulleys 50, around which a pair of feeding belts 51 extend. Carried by the shaft 47 is a grooved pulley 52 which is rotated by a belt 53 surrounding a similar pulley 54 on the drive shaft of an electric motor 55 (Fig. 1). When the motor 55 is operated, the feeding belts 51 are caused to travel in the direction indicated by the arrows in Fig. 1. The belts 51 are adapted to engage the peripheries of the cans C delivered by the conveyor 15 onto the track 14 and to cause the cans to roll therealong toward the right as viewed in Fig. 1. A roller 57 is rotatable between the struts 46 and its reduced ends are slidable in vertical slots 58 in the struts. Blocks 59 are urged downwardly by springs 60 and engage the ends of the roller 57 to depress the latter into engagement with the inside of the belts 51. In this manner, the roller 57 serves as a belt tightener and, due to the spring action, it tends to bow the lower portion of the belts 51 downwardly as shown in Fig. 1. The roller 57 is disposed above the discharge opening 17 so that when a defectively labeled can arrives at this position, the roller, acting against the belts, forcibly ejects the can when the gate members 20 and 21 are opened.

Figures 3, 4, 5:
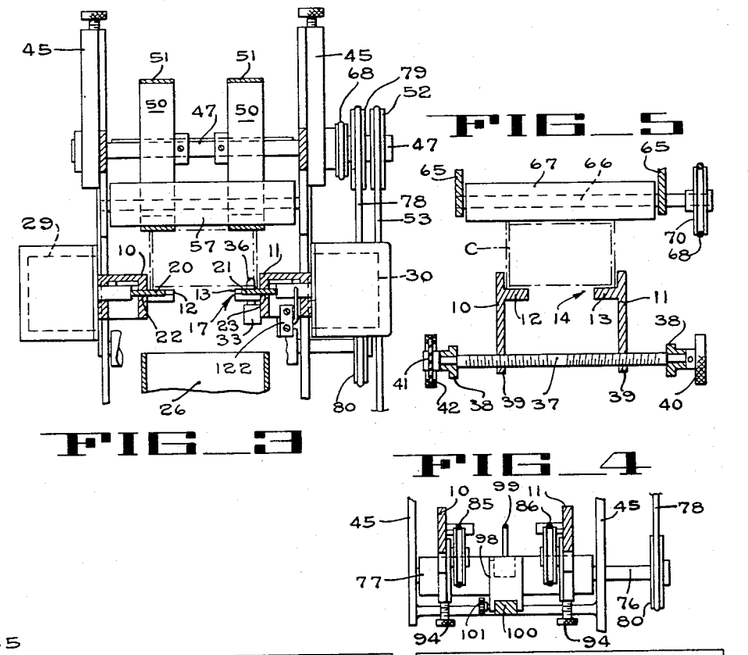
Fig. 3 is a cross-sectional view, taken on line 3—3 of Fig. 1.
Fig. 4 is a cross-sectional view, taken on line 4—4 of Fig. 1.
Fig. 5 is a cross-sectional view, taken on line 5—5 of Fig. 1.

As illustrated in Fig. 1, the shafts 47 and 48 are rotatable in bearing blocks 62 which are slidable in vertical openings in the extensions 45. The bearing blocks 62 are connected to the lower ends of adjusting screws 63 so that when the screws are rotated, the pulleys 50 are raised or lowered to adjust the distance of the lower portion of the belts 51 above the track 14 so as to accommodate cans of various diameters. Pivoted on the shaft 47 is a pair of arms 65 which support a cross shaft 66 which carries a feeding roller 67. The shaft 66 and the roller 67 are driven from the shaft 47 by means of a belt 68 passing around pulleys 69 and 70 carried by the respective shafts 47 and 66 (Figs. 1 and 5). The arms 65 are normally pivoted downwardly by means of a spring 72, this movement being limited by the engagement of an adjustable stop screw 73 on one arm 65 with a pad 74 on the forward extension 45. The feeding roller 67 functions to feed the individual cans C onto the track 14 to be thereafter fed by the belts 51. As each can is fed onto the left-hand end of the track 14, the roller 67 engages the same and propels it toward the right, the roller yielding upwardly to permit the can to pass therebeneath. The rotative speed of the roller 67 is such that the cans are fed toward the right at a predetermined speed, and the roller thus acts to separate the cans and cause them to move along the track in predetermined spaced relationship.

Rotatable beneath the track 14 adjacent the left-hand end of the machine is a transverse shaft 76 which carries a resilient roller 77, the shaft being driven from the shaft 47 by means of a belt 78 passing around pulleys 79 and 80 on the respective shafts 47 and 76. The roller 77 is employed for driving a pair of detector elements 85 and 86, to be next described.

The detector elements 85 and 86 are in the form of endless coil springs which extend around grooved pulleys 87 and 88. The pulleys 87 and 88 are rotatable on studs 89 and 90, the latter studs being held in the side frames 10 and 11. The other studs 89 are carried by blocks 91 slidable in vertical slots 92 formed within downward projections of the side frames 10 and 11. Adjusting screws 94 on the projections engage the blocks 91 and, by turning the screws, the blocks and studs 89 can be adjusted vertically. The left-hand end of each detector element 85 and 86 engages the resilient roller 77 (Figs. 1 and 2) so as to be driven thereby in clockwise direction, in other words, in the same direction as the lower portion of the can-feeding belts 51. Due to the vertical adjustment of the left-hand end of the detector elements 85 and 86, the elements can be inclined with respect to the horizontal track 14, the upper portion of the right-hand end of the elements being disposed slightly above the track. Thus, any desired length of the elements 85 and 86 can be made to project above the track 14, this being an important feature of the invention since it permits the projection of a length which is sufficient to cause the entire periphery of the cans to contact the detector elements. As shown in Fig. 2, the detector elements 85 and 86 are adjusted laterally to positions wherein they engage the cans rolling along the track 14 adjacent the end flanges of the cans. In other words, the detector elements engage the edge portions of the labels of the cans and this is important since, as pointed out before, a great proportion of the tears or imperfections in the labels occur at these edge portions.

The contacts or detector elements employed in prior can-sorting machines often become ineffectual due to the fact that their surfaces, which engage the can labels, become coated with the glue or other adhesive used to bind the labels to the cans. When such a condition prevails, it becomes impossible to establish electrical contact between the detector elements and the metal can, and, as a result, improperly labeled cans are not detected. In the present improved machine, such a condition is avoided by constructing the detector elements 85 and 86 in the form of endless coil springs. As the elements travel around the pulleys 87 and 88, their convolutions are caused to open to a slight extent so that a film of the adhesive extending between such coils is stretched and thus broken. To further guard against the accumulation of the adhesive agent on the detector elements 85 and 86, we prefer to utilize a pair of scraper elements 95 (Fig. 1) which are located beneath the elements and which are engageable with the elements to strip the adhesive therefrom. The scraper elements 95 may be of any suitable construction and are, therefore, not described in detail. The detector elements 85 and 86 travel at a slow rate of speed, when compared to the rate of travel of the feeding belts 51, and due to their ability to stretch and contract, scuffing of the labels is avoided.

The sorting machine is further provided with a detector device 98 which is in the form of a crystal detector having a hair-like finger or "whisker" 99 having one end engaging the crystal and another end disposed slightly below the track 14. The detector device 98 is carried by a stationary element such as a longitudinally extending arm 100 of the bed plate 38. The finger 99 is adapted to be moved to a very slight extent by a loose flap of a can label as the can rolls along the track so as to disturb the setting of the inner or lower end of the finger on the crystal for the purpose to be later explained. When the machine is used in connection with a can-labeling machine, the cans are delivered to the inspecting or sorting machine in the same relative position, that is, with the seams of their labels contacting the same point on the track. Due to this condition, it is possible to detect loose flaps of label seams by the use of the single, small finger 99. However, it is important that the finger 99 be disposed at the exact point at which the seam first encounters the track 14 in order to be positively engaged by the loose flap. Since cans of different diameters can be inspected in the present machine, the point of engagement referred to above may be at various locations along the track. For this reason, it is necessary to adjust the detector device 98 along the track 14 to dispose its finger 99 in the appropriate position. As shown in Figs. 1 and 2, the detector device 98 is adjustable along the arm 100 and can be held in adjusted positions by a set screw 101. It is within the concept of the invention to provide a plurality of the detector devices 98, and in this case the devices may be adjustable with respect to one another.

The detector elements 85 and 86, and the detector device 98, are connected in an electronic circuit, indicated generally at 110, this circuit including a rectifier stage 111, and a voltage regulator stage 112. The electronic circuit 110 also includes a gas filled control tube 113 which is of the type known as a tetrodethyratron tube and which has a filament 114, a grid 115 and a plate 116. Negative current is supplied to the grid 115 through a circuit line 117 in which the detector elements 85 and 86 and the detector device 98 are connected. A line 118 is connected between the line 117 and the track 14 and a potentiometer 119 is interposed in the line 117. Included in the line 120 connected to the plate 116 of the tube 113 is the coil 121 of the relay 35 and a normally closed switch 122. The switch 122 is preferably of the microactuated type and is positioned to be engaged by the gate 21 when the latter is retracted by the solenoid 30.

Figs. 7 to 16, inclusive, illustrate a modified form of detector track and loose flap detector. The remaining parts of the apparatus shown in the latter figures however, are generally similar to those shown in Figs. 1 to 6, inclusive, and will, therefore, be designated by the same numerals employed in connection with Figs. 1 to 6, inclusive, with the exception that the suffix "a" will be added thereto.

In the modified form of the invention shown in Figs. 7 to 16, inclusive, the coil spring belt detector elements 85 and 86 shown in Figs. 1 to 6, inclusive, are replaced by a pair of pivotally mounted spring biased detector blades 200 and 201 (Figs. 7, 8, 11 and 12). These blades are of relatively thin, electrically conductive material, and each is tapered toward its straight upper edge, which is thin, but not sharp, so that it will cut through accumulations of gummy substance which may overlie the metal of the can, but will not cut the label or the metal of the can itself. Since both detector blades and their mountings are similar to each other, only the blade 200 will be described in detail. Each detector blade is reinforced by a stiffening strip 202 secured along its lower edge.

The leading end of each detector blade is pivotally connected to a mounting block 203 by a shouldered screw 204, and is insulated from the screw and from the track 14a by an insulating bushing 205. The blade mounting block 203 is secured for vertical adjustment to the under side of the track 14a by a mounting pin 207 which is slidably inserted in a hole in the mounting block. A set screw 208 secures the block in vertically adjusted position on the mounting pin.

The upper end of the mounting pin 207 is brazed to one end of a link 209 (Figs. 11 and 13), the other end of the link being secured to the under side of the track 14a by a screw 210. Upon loosening the screw 210 and the set screw 208, the link 209 may be swung about the shank of the screw 208 as a pivot to move the mounting block 203, and thereby the leading end of the detector blade 200, inwardly or outwardly toward or away from its can supporting track upon which it is mounted. The lower end of the pin 207 is squared to receive a wrench, not shown, whereby the pin and its connected link 209 can be turned without completely loosening the set screw 208 and mounting screw 210 which facilitates the making of accurate adjustments.

A second mounting block 211 is rigidly secured to each detector blade rearwardly from the first pivotal mounting block 203 thereon. Screws 212 secure the second block 211 to the blade, and insulating bushings 213 and a strip 214 of insulating material insulate the second block 211 from the blade. An endwise opening notch 215 is provided vertically through each rearward mounting block 211, and receives freely a second mounting pin 217 which is generally similar to, but somewhat longer than, the first mounting pin 207. The upper end of this second mounting pin is adjustably secured to the under side of the track 14a by a link 218 and screw 219, and the lower end of the second pin 217 is squared, all similarly to the first pin 207. A blade-supporting coil spring 220 is held in compression between a washer 221, which rests against the under side of the second mounting block 211, and a collar 222, which is secured in vertically adjusted position on the second mounting pin 217 by a set screw.

Vertical adjustment of the forward end of each detector blade on its first mounting pin 207 changes the effective length of the upper edge of the detector blade which is thereby raised above or lowered beneath the can supporting level of the track 14a into or out of can-contacting position, as the case may be. The spring biased or normal height of the rearward or discharge end of each detector blade, as well as the spring pressure exerted thereon by the coil spring 220, may be adjusted by changing the position of the spring supporting collar 222 on its supporting pin 217. As in the case of the spring belt detectors 85 and 86 shown in Figs. 1 to 6 inclusive, the detector blades 200 and 201 are swung downwardly about their pivotal mountings as each can rolls across them, so that when properly spaced from the can ahead, each can remains in contact with the track 14a throughout the length of the detector blades.

In the event that two cans should pass along the track 14a and across the detector blades 200 and 201 in rim-to-rim contact with each other, the first can of the pair being properly labeled, and the second being defectively labeled, the first can will swing the detector blades downwardly about their forward mounting pivot pins 204, maintaining the blades free from contact with the second can until the first can has passed beyond the detector blades, the ejector actuating switch lever 36a and onto the gate or bridge flanges 20a and 21a.

The properly labeled leading can then would not be deflected downwardly through the discharge opening even though the improperly labeled following can should thereupon close the detector circuit, since the solenoids 29a and 30a would not be energized until the second can had depressed the ejector actuating button 36a. By that time the leading or properly labeled can of the pair would be almost across the gap, and would be traveling at such high speed that it would easily pass onto the portion of the track beyond the gap. However, the closing of the detector circuit by the defectively labeled second can will cause it to be rejected in a usual manner by the energizing of the solenoids 29a and 30a.

While such rim-to-rim positioning of cans passing through the detector stage of the device is undesirable, and in fact is impossible if the feeding or spacing roller 67a of the machine is in position to contact and properly space the cans, occasionally when extremely high speed operation is required an inexperienced operator may move the spacing roller 67a upwardly out of the path of the cans, thereby allowing the cans to pass through the apparatus in rim-to-rim contact with each other. While it is clear that the detecting sensitivity of the machine will not be as great with the cans passing through in rim-to-rim contact as it would be if they were properly spaced, nevertheless the apparatus will still detect and reject a large proportion of defectively labeled cans even under such adverse conditions and will detect and reject all unlabeled or "bright" cans.

Figure 9:
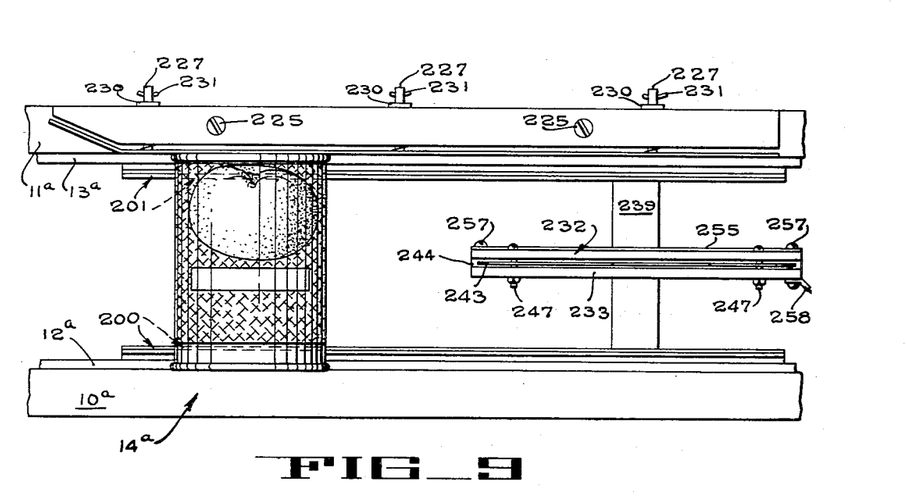
Fig. 9 is an enlarged portion of Fig. 8 showing a defectively labeled can rolling along the label detector track section.

The adjustment provided by the links 209 and 218 for moving the detector blades laterally toward or away from the tracks is of great assistance in adjusting the sensitivity of the machine. For example, canners at times do not wish cans with labels only slightly misplaced or torn only at the edges to be rejected, while at other times they may require that only perfectly labeled cans shall be permitted to pass through the machine. In Figure 9 where a can is shown with its label misplaced endwise of the can, it will be noted that the right hand detector blade 200 is positioned to engage an unlabeled or "bright" portion of the can, and thereby will cause the can to be rejected. By adjusting the detector blade 200 inwardly further away from its supporting track 14a it is obvious that such cans could be permitted to pass through the apparatus without detection.

In order to insure that successive cans will pass through the machine in exactly aligned position, and to provide a wiping electrical contact with the ends of the cans to insure grounding the cans to one side of the detector circuit while they are passing through the detecting stage of the device, a spring pressed end contact strip 223 (Figs. 7, 8 and 10) is resiliently supported on a bar 224 secured on the upper edge of the side wall of the track 14a by screws 225. The end contact strip 223 has a plurality of posts 227 brazed thereto to extend laterally outwardly through holes 228 transversely through the mounting bar 224.

Figure 10:
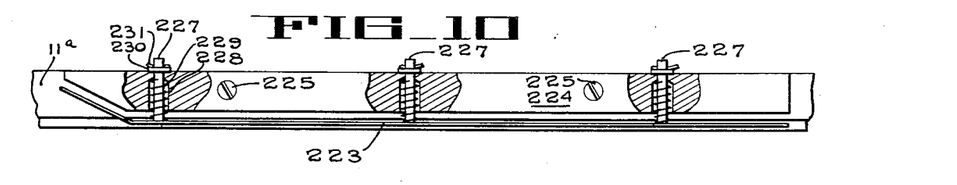
Fig. 10 is an enlarged fragmentary plan view of an electrical contact and can positioning strip mounted on a portion of the can supporting track, portions of a strip supporting bar being broken away.
Figure 11:
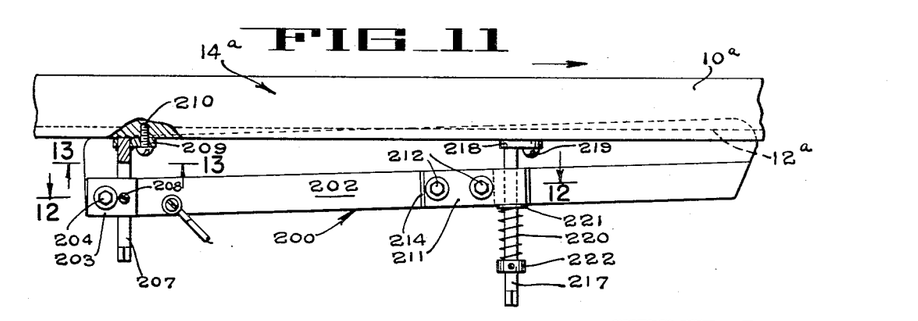
Fig. 11 is a side elevation of a portion of the track and a detector blade looking in the direction of the arrows 11—11 in Fig. 8.
Figure 12:
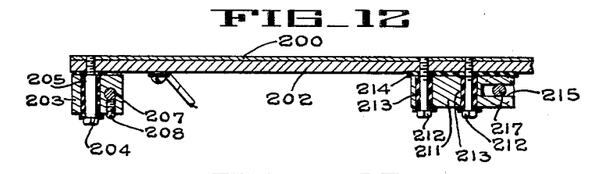
Fig. 12 is a fragmentary section taken on the line 12—12 of Fig. 11.
Figure 13:
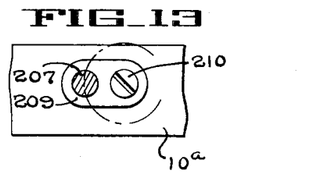
Fig. 13 is an enlarged fragmentary section taken on the line 13—13 of Fig. 11.

The end contacting strip 223 is biased inwardly toward the center of the space between the tracks by light coil springs 229 surrounding the posts 227 and inserted in enlarged inner portions of the holes 228. The springs 229 are held in compression between the end contacting strip 223 and the bottoms of the enlarged portions of the holes 228 to exert an inward bias on the strip 223. The inward limit of movement of the posts 227 under the impulse of the springs 229 is determined by washers 230 held in position on the posts 227 by cotter pins 231 (Fig. 10). The leading or forward end of the strip 223 and its mounting bar 224 are disposed at an angle outwardly away from the can supporting track 14a to have cam-like initial engagement with the ends of the cans as they roll along the track.

Figures 14, 15:
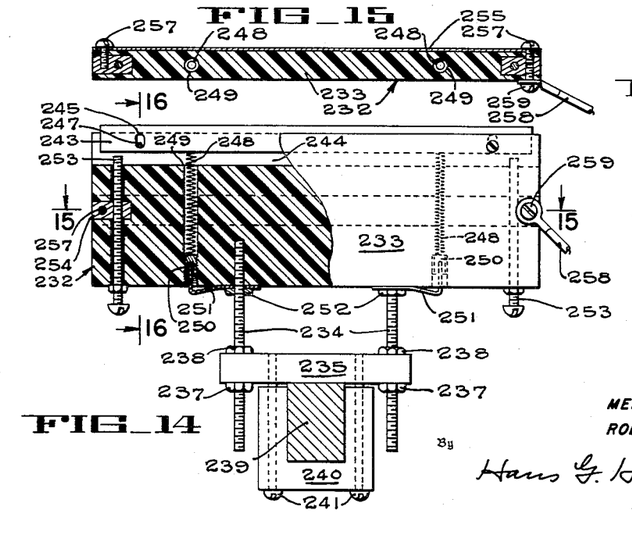
Fig. 14 is an enlarged fragmentary section taken on the line 14—14 of Fig. 8, the left hand portion of a loose end flap detector being broken away along a vertical midplane.
Fig. 15 is a horizontal section taken on the line 15—15 of Fig. 14.
Figure 16:
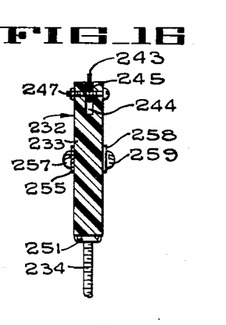
Fig. 16 is a fragmentary vertical section taken on the line 16—16 of Fig. 14, the lower support portions shown in Fig. 14 being omitted.

A modified form of loose end flap detector 232 is shown in Figs. 14, 15 and 16. The flap detector comprises an upright body member 233 of insulating material such as plastic block, supported for vertical adjustment upon threaded rods 234, the upper ends of which are screwed into threaded holes in the body member 233. The lower ends of the support rods 234 are inserted through holes in the laterally extending end portions of a supporting bar 235, and are secured therein in vertically adjusted position by nuts 237 and 238.

Figure 8:
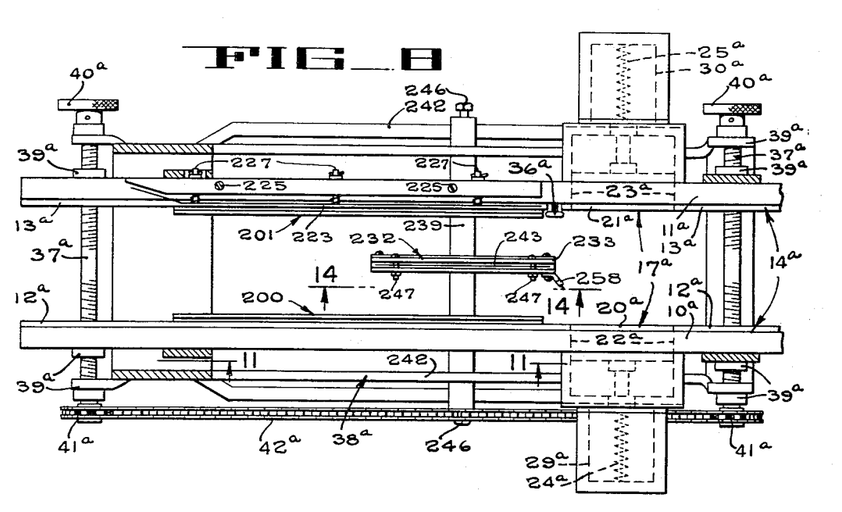
Fig. 8 is a horizontal section in reduced scale taken on the line 8—8 of Fig. 7.

The bar 235 is mounted on a transversely extending square rod 239, being secured in laterally adjusted position thereon by a U-shaped clamp 240 which is drawn into clamping engagement with the rod 239 by screws 241 (Fig. 14). The square rod 239 itself is slidably mounted on rods 242 (Figs. 7 and 8) which are mounted lengthwise of the machine to the bed plate 38a. The square transverse rod 239 has holes through its ends for slidably receiving the longitudinally disposed rods 242, and is secured in adjusted position thereon by set screws 246 (Fig. 8).

A light, thin, flap-contacting metal strip 243 is mounted with adequate side clearance in a groove 244 extending lengthwise of the top of the insulative body block 233. The flap contacting strip 243 has a pair of vertically slotted holes 245 therethrough, in which are inserted small retaining bolts 247 mounted in holes through the insulative block 233. The block 233 is mounted beyond the path of the cans rolling along the tracks, and may be adjusted by means of the nuts 237 and 238 so that the edge of the flap contacting strip 243 is beyond the path of the cans, but is within range of loose label end flaps which may project from a can rolling along the track. While shown as mounted beneath the path of the cans it is obvious that the detector could be mounted in the same relative position above the track 14a and just beyond the path of the cans through the machine so that the flap contacting strip 243 would be within striking distance of a loose label end flap. When mounted in inverted position above the path of the cans the weight of the strip 243 will hold it at its outward limit of movement in the groove 244.

When mounted upright as shown in the drawings however, a pair of extremely light coil springs 248 are inserted in holes 249 extending vertically through the block 233, the upper ends of the springs projecting into the strip receiving groove 244 in the block. These springs are held in compression between the bottom of the flap contacting strip 243 and set screws 250 screwed into the threaded lower portion of each of the spring receiving holes. Each of the set screws 250 is engaged by one end of a conductor 251 the other end of which is connected to one of the vertical threaded block supporting rods 234 by a nut 252, thereby to ground the flap contacting strip 243 to the frame of the machine through the light coil springs 248, the set screws 250, the conductor 251, the square transverse rod 239 and the longitudinally disposed rods 242. The strip supporting coil springs 248 are of just sufficient strength normally to bias the light flap contacting strip upwardly so that the lower marginal edges of the slotted holes 245 are held in contact with the small retaining bolts 247. The springs 248 are so light that they permit the flap contacting strip 243 to be depressed by the lightest possible touch; namely by being brushed by the loose end flap of a label which may project outwardly from a can rolling through the apparatus on the tracks 14a.

Contact posts 253 are provided one at each end of the insulative block 233, being inserted upwardly through vertical holes provided in the body of the block. The contact posts are screwed through threaded holes in a pair of metal inserts 254 which are molded integrally in the body of the block 233. The metal inserts 254 are electrically connected to each other by a strip 255 of electrically conductive metal secured to the inserts 254 by screws 257. A conductor wire 258 is connected by a screw 259 to the connecting strip 255, and thence into the ejector actuating circuit in the same manner as is shown for the loose flap detector 98 shown in Figs. 1, 2, 4 and 6. The sensitivity of the loose flap detector 232 may be varied in an obvious manner by changing the pressure on the springs 248 by means of the set screws 250, and by varying the distances between the upper ends of the contact posts 253 and the flap contacting strip 243.

The location of the loose flap detector 232 lengthwise of the machine should be such that as the cans from the labeling machine roll along the tracks 14a through the machine the overlapping ends of each label will tend to be on the under side of the can, substantially midway of the effective length of the loose flap contacting strip 243. It is obvious that due to the much greater effective length of this latter type of loose flap detector, than that shown in Figs. 1, 2 and 4, considerable leeway is provided as to where the loose flap can be positioned in order to actuate the detector element. This is an important factor, since when the cans are fed at high speed through a labeler and thence through the present detecting and rejecting mechanism, there frequently is some slippage of the cans which varies the position of the label overlap on successive cans.

The improved can-sorting apparatus shown in Figs. 1 to 6 inclusive, operates in the following manner.

The apparatus is prepared for operation by first adjusting the side frames 10 and 11 toward or away from each other in accordance with the length of the cans to be inspected, it being noted that the end flanges of the cans are intended to roll upon the track ledges 12 and 13 as shown in Fig. 2. The feeding belts 51 are then adjusted vertically with respect to the track 14 in accordance with the diameter of the cans to be inspected, after which the height of the feeding roller 67 is also adjusted. The inclination of the detector elements 85 and 86 and the longitudinal location of the finger 99 of the detector device 98 are finally adjusted in accordance with the characteristics of the cans to be inspected.

With the various adjustments thus made, the machine is ready for operation and the motor 55 is started in a usual manner to cause the feeding roller 67, the feeding belts 51 and the detector elements 85 and 86 to rotate in directions which will cause cans C fed onto the left-hand end of the track 14 to be rolled through the machine along the track. During the operation of the machine, the roller 67 acts to maintain the cans spaced apart at a predetermined distance, this relationship not being shown in Fig. 1 since the cans are shown in different selected positions for the purpose of illustration. The cans C enter the apparatus from a can-labeling machine and, assuming that the labels have been properly applied thereto and the labels are not defective upon entering the apparatus, they will be fed therethrough by the belts 51 along the track 14 and delivered to the conveying means 16 which may convey the cans to a packaging machine or other equipment.

Occasionally a label is defective or is improperly applied and, when such is the case, the can having such a label is separated from the line of cans passing through the apparatus in the manner next explained. When a can having a torn label rolls along the detector elements 85 and 86, the exposed portion of the periphery of the can contacts one or both of the detector elements, depending upon the extent of the tear, and since the negative wire 117 is connected to the elements 85 and 86 and the positive wire 118 is connected to the track 14, a short circuit is created which causes positive voltage to flow to the grid 115 of the control tube 113 to cause sufficient voltage in the line 120 to energize the relay 35. Closing of the relay switch 34 partially closes the electrical circuit 31 in which the solenoids 29 and 30 are connected. It is a characteristic of the tetrode thyratron tube 113 that once the flow of sufficient current to the plate 116 is established, such flow will be maintained until disrupted by opening the electronic circuit, for example, by opening the switch 122.

As the defectively labeled can rolls from the righthand end of the detector elements 85 and 86, it depresses the button 36 of the switch 33 so as to close the same. The circuit 31 is thus entirely closed so that the solenoids 29 and 30 are energized to retract the gate members 20 and 21 from the opening 17. Consequently, the defectively labeled can falls through the opening 17 into the chute 26 and thus is separated from the line of cans passing through the apparatus. The spring-pressed roller 57 acts with a downward motion to forcibly eject the can from the track 14.

As the gate member 21 approaches its fully retracted position, it engages the actuating finger of the switch 122 so as to open the latter and thus open the line 120 to deenergize the relay 35, this action also inactivating the control tube 113 to restore it to its original condition. Opening of the switch 34, of course, opens the circuit 31 to deenergize the solenoids 29 and 30 so that the gate members 20 and 21 are returned to the operative position shown in Fig. 3 to form part of the track 14.

It also occurs that the ends of labels applied to a can are not properly glued together, and this results in a loose flap which projects from the periphery of the can. When such a can enters the apparatus, the loose flap encounters the finger 99 of the crystal detector device 98 and even though the engagement is extremely light, the setting of the inner end of the finger on the crystal is disturbed, thus momentarily, at least, changing the polarity of the electrical current in the grid line 117. Such a condition results in activation of the control tube 113 to energize the relay 35 so as to close the switch 34. When the switch 33 is later closed by the improperly labeled can as the latter rolls thereacross, the solenoids 29 and 30 are energized to retract the gate members 20 and 21 to discharge the can from the track 14. It is thus seen that the present apparatus functions to detect the presence of cans having torn or otherwise imperfect labels and cans in which the ends of the labels have been improperly joined, and to discharge such cans from the line of cans rolling along the track. It will also be observed that the detector means are extremely sensitive and positive in action so that the defectively labeled cans are inspected with great accuracy. Moreover, the apparatus is entirely adjustable so that it can operate on cans of various lengths and diameters.

The operation of the modified form of the invention shown in Figs. 7 to 16, inclusive, will be obvious from the foregoing description of the operation of the form thereof shown in Figs. 1 to 6 inclusive, with the possible exception of the lateral adjustment of the detector blades 200 and 201 by means of the links 209 and 218. To accomplish such adjustment, the distance from the end of the can beyond which it is desired label defects shall cause rejection must first be set by the canner or customer for whom the cans are to be labeled. This being established, the detector blades 200 and 201 are adjusted at the distance inwardly from the sides of the tracks 14a by slightly loosening the set screws 208 and mounting screws 210 and 219 (Figs. 11 and 12) and, by means of a wrench if desired, turning the first and second mounting pins 207 and 217 to swing the links to position the detector blades at the required distance from, and parallel to the tracks 14a. With the blades thus adjusted, the loosened set screws and mounting screws again are tightened to secure the blades in their newly adjusted positions.

While we have herein shown and described the improved can-sorting apparatus as embodied in a preferred form of construction, by way of example, and modified forms of defective label detectors therefor, it will be apparent that various modifications might be made in the structure without departing from the spirit of the invention. Consequently, we do not wish to be limited in this respect but desire to be afforded the full scope of the appended claims.

We claim:

1. A sorting apparatus for detecting and ejecting unlabeled and improperly labeled cans from a line of cans comprising a track along which the cans roll on their rims through the apparatus, electrically operated means adapted when energized to eject a can from said track, an endless flexible detector element of electrically conductive material mounted for continuous rotation in the path and direction of movement of the cans along said track, said detector being adapted to engage the entire periphery of a can moving along said track so as to directly contact a bare surface of an unlabeled or improperly labeled can, and a normally open electrical circuit interconnecting said track, said can ejecting means, and said endless detector element, said circuit being adapted to be closed by contact of said endless detector element with a bare area of a can.

2. A sorting apparatus for detecting and ejecting unlabeled and improperly labeled cans from a line of cans comprising a track along which the cans roll on their rims through the apparatus; electrically operated means adapted when energized to eject a can from said track; an endless flexible detector element of electrically conductive material extending along said track and mounted for continuous rotation in the path of movement of the cans along said track, said detector being adapted to engage the entire periphery of a can moving along said track so as to directly contact a bare surface of an unlabeled or improperly labeled can; drive means including a resilient roller frictionally contacting said endless detector element for rotating said detector element; and a normally open electrical circuit inter-connecting said track, said can ejecting means, and said endless detector element, said circuit being adapted to be closed by contact of said endless detector element with a bare area of a can.

3. A sorting apparatus for detecting and ejecting unlabeled and improperly labeled cans from a line of cans, comprising a track along which the cans roll through the apparatus, said track having a can discharge gap therein, a movable gate normally spanning said gap and across which the cans roll, electrical operating means electrically connected in a normally open electrical circuit and adapted upon energization of said circuit to move said gate means in a direction to open said gap to allow a defectively labeled can to fall therethrough, pulleys spaced longitudinally of said track, an endless detector element of electrically conductive material adapted to partially close said circuit through said track when said track and said element are contacted by the exposed metallic surface of a defective can, said endless detector element being in the form of an endless continuously moving belt trained around said pulleys and extending along said track and having a portion extending into the path of the cans moving therealong, and switch means extending into the path of the defective can for actuation by the can to complete the closing of said circuit to energize said gate operating means and open said discharge gap.

4. A sorting apparatus for detecting and ejecting unlabeled and improperly labeled cans from a line of cans comprising a track along which the cans roll through the apparatus, said track having a can discharge gap therein, movable gate means normally spanning said gap and across which the cans roll, electrical operating means electrically connected in a normally open circuit and adapted upon closing of said circuit to move said gate means in a direction to open said gap to allow a defectively labeled can to fall therethrough, an endless flexible detector element of electrically conductive material extending along said track and having a portion continuously movable into the path of movement of the cans on said track, said detector element portion being adapted to engage the entire periphery of a can moving along said track so as to directly contact a bare surface of an unlabeled or improperly labeled can, whereby to partially close said normally open circuit, and switch means extending into the path of the defective can for actuation thereby to complete the closing of said circuit.

5. An apparatus as defined in claim 4 in which said gate means comprises at least one plate-like element slidable in a path extending transversely of said track.

6. An apparatus as defined in claim 4 in which said gate means comprises at least one plate-like element slidable in a path extending transversely of said track, said gate operating means comprising a solenoid operatively connected to said gate.

7. A sorting apparatus for detecting and ejecting unlabeled and improperly labeled cans from a line of cans comprising a track along which the cans roll through the apparatus, said track having a can discharge gap therein, movable gate means normally spanning said gap and across which the cans roll, electrical operating means electrically connected in a normally open circuit and adapted upon closing of said circuit to move said gate means in a direction to open said gap to allow a defectively labeled can to fall therethrough, an elongated belt-like detector element of electrically conductive material extending along said track, said detector element being pivotally mounted near its leading end and having a portion of its upper run adjacent the leading end extending into the path of movement of a can moving along the track, means for continuously moving said belt-like detector element upwardly toward the path of movement of the can and forwardly in the direction of said path, means for adjustably pivoting said detector to vary the length of the upper run portion extending into the path of movement of the cans, said detector element being arranged to engage the entire periphery of a can moving along said track so as to directly contact a bare surface of an unlabeled or improperly labeled can, whereby to partially close said normally open circuit, and switch means extending into the path of the defective can for actuation thereby to complete the closing of said circuit.

8. An apparatus as defined in claim 7 in which said detector element includes a pair of endless coil springs arranged in laterally spaced relation in position to contact the exposed surface of a can adjacent both beaded flanges thereof, and means for adjusting said coil spring detector elements toward and away from each other in accordance with the length of cans to be sorted to maintain the positions of said coil spring detector elements relative to the beaded flanges of cans moving through said apparatus.

9. A sorting apparatus for detecting and ejecting unlabeled and improperly labeled cans from a line of cans comprising a track along which the cans roll through the apparatus, said track having a can discharge gap therein, a movable gate normally spanning said gap and across which the cans roll, electrical operating means electrically connected in a normally open electrical circuit and adapted upon energization of said circuit to move said gate means in a direction to open said gap to permit a defectively labeled can to fall therethrough, a belt-like endless detector element of electrically conductive material extending along said track with a portion of the length of said element disposed in the path of cans moving along said track, means mounting said detector element for adjustable movement relative to the path of the cans to vary the effective length of the portion extending into the path, said detector element being adapted to partially close said normally open circuit through said track when said track and said element are simultaneously contacted by the exposed metallic surface of a defective can, and switch means connected in said circuit and extending into the path of movement of said defective can on said track to be actuated by said can for completing the closing of said circuit to energize said gate moving means to open said discharge gap.

10. A sorting apparatus for detecting and ejecting unlabeled and improperly labeled cans from a line of cans comprising a pair of spaced support members affording a track along which the cans roll in spanning relation, said track having a can discharge gap therein, a movable gate normally spanning said gap and across which properly labeled cans roll, a normally open electrical circuit means having means therein for withdrawing said gate from said gap to discharge unlabeled and improperly labeled cans therethrough when said circuit is closed, an endless coil spring detector element of electrically conductive material extending along the path of movement of cans on said track and into said path, said detector element having a length at least equal to the circumferential dimension of the can, electrical means connected to said circuit and energized by the metallic surface of a can contacting said detector element for partially closing said circuit, and switch means extending into the path of movement of the defective can on said track to be actuated by said can to complete the closing of said circuit to energize said gate withdrawing means.

11. A sorting apparatus for detecting and ejecting unlabeled and improperly labeled cans from a line of cans comprising a pair of spaced support members affording a track along which the cans roll in spanning relation, said track having a can discharge gap therein, a movable gate normally spanning said gap and across which properly labeled cans roll, a normally open electrical circuit means having means therein for withdrawing said gate from said gap to discharge unlabeled and improperly labeled cans therethrough when said circuit is closed, an endless coil spring detector element of electrically conductive material extending along the path of movement of cans on said track and into said path, said detector element having a length at least equal to the circumferential dimension of the can, electrical means connected to said circuit and energized by the metallic surface of a can contacting said detector element for partially closing said circuit, switch means extending into the path of movement of the defective can on said track to be actuated by said can to complete the closing of said circuit to energize said gate withdrawing means, feeding means for feeding the cans along said track in equally spaced relationship, a roller disposed above said track ahead of said feeding means and ahead of said discharge gap and arranged to engage the periphery of cans placed on said track, and operating means for rotating said roller in a direction to feed cans individually along said track into engagement with said feeding means.

12. An apparatus as defined in claim 11 in which said roller is yieldingly mounted and adapted to move in a vertical plane, said roller being arranged to yield upwardly to permit each can to roll thereunder.

References Cited in the file of this patent

UNITED STATES PATENTS

| Number | Name | Date |
|---|---|---|
| 1,217,092 | Hopp | Feb. 20, 1917 |
| 1,407,887 | Pigeon | Feb. 28, 1922 |
| 1,510,616 | Wild | Oct. 7, 1924 |
| 1,690,345 | Poole | Nov. 6, 1928 |
| 2,270,428 | Flint | Jan. 20, 1942 |
| 2,560,737 | Palmer | July 17, 1951 |
| 2,570,288 | Todd | Oct. 9, 1951 |
| 2,601,514 | Goodban | June 24, 1952 |
| 2,704,601 | Vennes | Mar. 22, 1955 |